(12) United States Patent
Wang

(10) Patent No.: US 9,612,793 B2
(45) Date of Patent: Apr. 4, 2017

(54) WIRELESS COMMUNICATION SYSTEM AND METHOD FOR CONVERTING SPECIFIC DATA BETWEEN A NETWORK INTERFACE COMMUNICATION STANDARD AND AN INCOMPATIBLE RADIO BROADCASTING COMMUNICATION STANDARD

(71) Applicant: Noodoe Corporation, Taipei (TW)

(72) Inventor: John C. Wang, Taipei (TW)

(73) Assignee: NOODOE CORPORATION, Taipei (TW)

( * ) Notice: Subject to any disclaimer, the term of this patent is extended or adjusted under 35 U.S.C. 154(b) by 0 days.

(21) Appl. No.: 15/062,280

(22) Filed: Mar. 7, 2016

(65) Prior Publication Data

US 2016/0278091 A1    Sep. 22, 2016

(30) Foreign Application Priority Data

Mar. 17, 2015    (TW) .............................. 104108400 A

(51) Int. Cl.
| | |
|---|---|
| *G06F 3/16* | (2006.01) |
| *G06Q 50/12* | (2012.01) |
| *G08B 7/06* | (2006.01) |
| *H04W 4/00* | (2009.01) |
| *H04W 4/06* | (2009.01) |

(52) U.S. Cl.
CPC ............ *G06F 3/167* (2013.01); *H04W 4/008* (2013.01); *H04W 4/06* (2013.01); *G06F 3/16* (2013.01); *G06Q 50/12* (2013.01); *G08B 7/068* (2013.01)

(58) Field of Classification Search
CPC ... G06F 3/167; G06F 3/16; G06F 3/01; G06F 3/017; G06F 3/02; G06Q 50/12; G08B 7/068
See application file for complete search history.

(56) References Cited

U.S. PATENT DOCUMENTS

| | | | | | |
|---|---|---|---|---|---|
| 5,828,294 | A | * | 10/1998 | Shank .................... | G08B 7/068 340/286.06 |
| 5,862,235 | A | * | 1/1999 | Kowalczyk ............ | H04B 1/082 381/14 |
| 6,366,196 | B1 | * | 4/2002 | Green .................... | G06Q 50/12 340/10.6 |
| 6,417,782 | B1 | * | 7/2002 | Darnall ................ | G08G 1/0965 340/435 |
| 7,372,361 | B1 | * | 5/2008 | Mealing ................ | G06Q 50/12 340/286.09 |
| 7,385,479 | B1 | * | 6/2008 | Green .................... | G06Q 10/00 340/286.02 |

(Continued)

FOREIGN PATENT DOCUMENTS

| | | |
|---|---|---|
| TW | I253834 B | 4/2006 |
| TW | 200833074 A | 8/2008 |

*Primary Examiner* — Devan Sandiford

(74) *Attorney, Agent, or Firm* — McClure, Qualey & Rodack, LLP

(57) ABSTRACT

Sound generation and transmission systems and methods using a radio transmitter are provided. A first electronic device receives specific data via a network connecting unit, generates a specific sound according to the specific data, and outputs the specific sound via a sound output unit. A radio transmitter receives the specific sound via a sound input unit, and broadcasts the specific sound in a specific frequency range via a radio transmission module.

11 Claims, 14 Drawing Sheets

(56) References Cited

U.S. PATENT DOCUMENTS

| | | | |
|---|---|---|---|
| 7,796,022 B2* | 9/2010 | Birtcher | G06Q 10/10 340/5.1 |
| 8,548,856 B2* | 10/2013 | Maruszak | G06Q 30/02 705/15 |
| 8,792,939 B2 | 7/2014 | Fisher | |
| 9,130,664 B2* | 9/2015 | Jin | H04B 11/00 |
| 9,330,647 B1* | 5/2016 | Bay | G06F 17/30761 |
| 2002/0107715 A1* | 8/2002 | Pace | G06Q 10/0631 705/7.13 |
| 2002/0147647 A1* | 10/2002 | Ragsdale-Elliott | G06Q 20/20 705/15 |
| 2003/0178258 A1* | 9/2003 | Leifer | G06F 1/1626 186/39 |
| 2005/0077999 A1* | 4/2005 | Alexander | G08B 7/068 340/286.09 |
| 2008/0171536 A1* | 7/2008 | Katz | H04M 1/575 455/412.2 |
| 2011/0199215 A1* | 8/2011 | Biessman | G08B 7/068 340/573.1 |
| 2012/0066144 A1* | 3/2012 | Berkvens | G06Q 10/00 705/345 |
| 2013/0232282 A1* | 9/2013 | Kim | H04M 1/72533 710/21 |
| 2014/0270287 A1* | 9/2014 | Park | H04M 1/7253 381/313 |
| 2014/0292500 A1* | 10/2014 | Hetterly | G08B 7/068 340/286.09 |
| 2015/0187028 A1* | 7/2015 | Hetterly | G08B 7/068 705/15 |

* cited by examiner

WIRELESS COMMUNICATION SYSTEM AND METHOD FOR CONVERTING SPECIFIC DATA BETWEEN A NETWORK INTERFACE COMMUNICATION STANDARD AND AN INCOMPATIBLE RADIO BROADCASTING COMMUNICATION STANDARD

BACKGROUND OF THE INVENTION

Field of the Invention

The disclosure relates generally to signal transmission systems and methods, and, more particularly to systems and methods that can generate sounds according to received signals, and transmit the sounds via a radio transmitter.

Description of the Related Art

In the service industry, the best way to increase customer satisfaction is by directly providing appropriate and immediate services to customers. One accepted method to improve service at a restaurant it to deploy a radio system. Each waiter can have a handheld transceiver, also called a Walkie-Talkie, and the waiter can broadcast their voice to other waiters via the handheld transceiver when messages needed to be transmitted between the waiters. For example, when a hostess notices that a customer needs a specific service, the host can notify other waiters of the specific service via the handheld transceiver, so that a waiter can provide the specific service for the customer.

On the other hand, when a customer is in a restaurant, and the customer needs a specific service, such as ordering food, having their water refilled, or receiving the check, the customer always raises a hand to attract the waiter and communicate their requests. However, during busy times, it is not easy to find a waiter, the customer's requests cannot be handled in real-time, and this results in customer dissatisfaction. Currently, wireless service bells have been deployed in some restaurants. Customers can push a service bell set on the table when they need service. The service bell can wirelessly transmit signals to reception equipment set on a counter or it can be worn by a waiter, so that the customers' calls can be attended to by the waiter without delay.

As described, the wireless service bells need compatible reception equipment. The cost of related equipment will become an additional burden for restaurants. Additionally, the deployment of related equipment may cause damage to the original decoration of restaurants. In view of the considerations of cost and beauty, restaurant owners may be reluctant to implement such a service even if they agree the advantages of related services. Therefore, there exists an opportunity to significantly reduce the drawbacks of prior arts and improve customer satisfaction by integrating related services with a radio system, resulting in a solution that will be more readily adopted by restaurants.

BRIEF SUMMARY OF THE INVENTION

Sound generation and transmission systems and methods using a radio transmitter are provided, wherein an electronic device can generate sounds according to received signals, and transmit the sounds via a radio transmitter.

An embodiment of a sound generation and transmission system using a radio transmitter comprises a first electronic device and a radio transmitter. The first electronic device comprises a network connecting unit, a sound output unit, and a processing unit. The processing unit receives specific data via the network connecting unit, generates a specific sound according to the specific data, and outputs the specific sound via the sound output unit. The radio transmitter comprises a sound input unit, a radio transmission module, and a controller. The controller receives the specific sound via the sound input unit, and broadcasts the specific sound in a specific frequency range via the radio transmission module.

An embodiment of a sound generation and transmission system using a radio transmitter comprises a network connecting unit, a radio transmission module, and a controller. The network connecting unit receives specific data. The controller generates a specific sound according to the specific data, and broadcasts the specific sound in a specific frequency range via the radio transmission module.

In an embodiment of a sound generation and transmission method using a radio transmitter, specific data is received by a network connecting unit. Then, a specific sound is generated according to the specific data, and the specific sound is broadcast in a specific frequency range via a radio transmission module.

In some embodiments, the sound input unit of the radio transmitter is connected to the sound output unit of the first electronic device via an audio connectivity cable, so that the specific sound is received from the sound output unit of the first electronic device.

In some embodiments, a specific electronic device generates the specific data. The specific electronic device comprises at least one sensor for detecting a motion or posture corresponding to the specific electronic device. A controller of the specific electronic device generates the specific data according to the detected motion or posture corresponding to the specific electronic device.

In some embodiments, a specific electronic device generates the specific data. The specific electronic device comprises at least one physical key. When the physical key is pressed, a controller of the specific electronic device generates the specific data.

In some embodiments, a specific electronic device generates the specific data. The specific electronic device determines whether a specific condition is met, and generates the specific data when the specific condition is met.

In some embodiments, a network connecting unit of the specific electronic device is in a peripheral mode, and the network connecting unit of the first electronic device is in a central mode. In the peripheral mode, the network connecting unit has data broadcasting capabilities, and the network connecting unit cannot actively connect to other electronic devices. In the central mode, the network connecting unit has data receiving capabilities, and the network connecting unit can actively connect to other electronic devices.

In some embodiments, the first electronic device further comprises a storage unit for storing a plurality of candidate sounds. The processing unit selects one of the candidate sounds as the specific sound according to the specific data.

In some embodiments, the processing unit obtains a plurality of texts or numbers according to the specific data, and transforms the texts or numbers into the specific sound according to a text to sound algorithm.

In some embodiments, the specific data comprises identification data corresponding to the specific electronic device, and processing unit of the first electronic device further generates a sound fragment according to the identification data, wherein the specific sound comprises the sound fragment.

In some embodiments, the radio transmitter has voice operated transmission (VOX) capabilities. When the specific sound is detected by the controller of the radio transmitter, the specific sound is automatically broadcasted in the specific frequency range via the radio transmission module, wherein the specific frequency range comprises VHF (Very High Frequency) or UHF (Ultra High Frequency).

Sound generation and transmission methods using a radio transmitter may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Sound generation and transmission systems and methods using a radio transmitter are provided.

Figure 1:
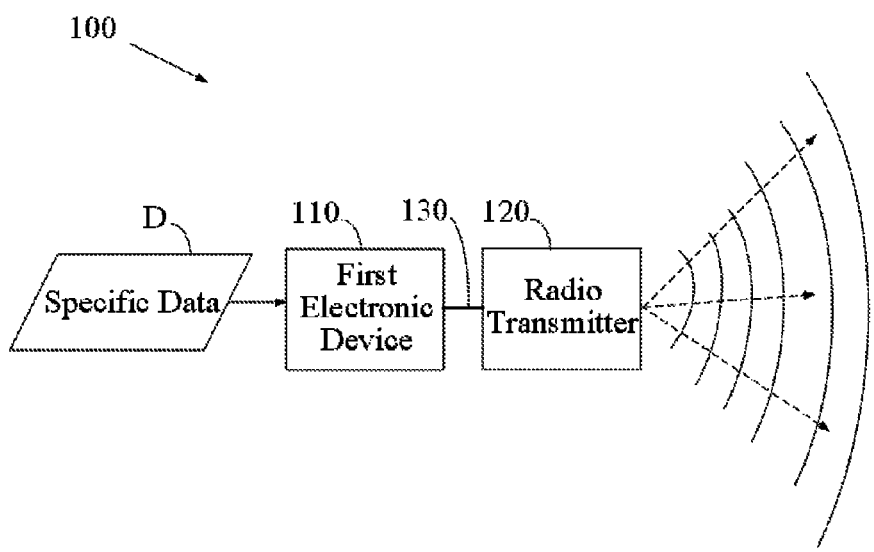
FIG. 1 is a schematic diagram illustrating an embodiment of a sound generation and transmission system using a radio transmitter of the invention.

FIG. 1 is a schematic diagram illustrating an embodiment of a sound generation and transmission system using a radio transmitter of the invention. The sound generation and transmission system using a radio transmitter 100 comprises a first electronic device 110 and a radio transmitter 120. The first electronic device 110 can be any electronic device having network connecting capabilities. The first electronic device 110 can receive specific data D. The first electronic device 110 and the radio transmitter 120 can be connected via an audio connectivity cable 130. The radio transmitter 120 can broadcast data in a specific frequency range, such as VHF or UHF. It is understood that, in some embodiments, the radio transmitter 120 can be placed nearby the first electronic device 110. When the first electronic device 110 outputs sounds in an environment, the radio transmitter 120 can obtain the sounds in the environment.

Figure 2:
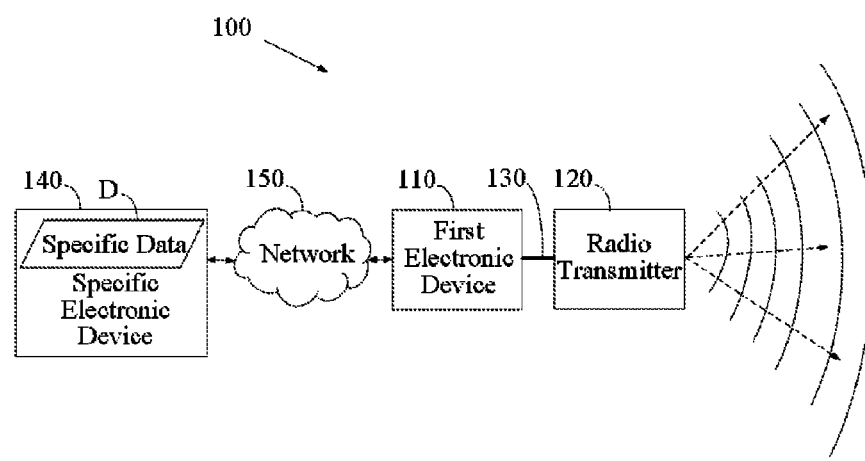
FIG. 2 is a schematic diagram illustrating another embodiment of a sound generation and transmission system using a radio transmitter of the invention.

FIG. 2 is a schematic diagram illustrating another embodiment of a sound generation and transmission system using a radio transmitter of the invention. The sound generation and transmission system using a radio transmitter 100 comprises a specific electronic device 140, a first electronic device 110 and a radio transmitter 120. The specific electronic device 140 and the first electronic device 110 can be any electronic device having network connecting capabilities. The specific electronic device 140 can transmit data, such as specific data D via a network 150, and the first electronic device 110 can receive the specific data D transmitted by the specific electronic device 140 via the network 150. The first electronic device 110 and the radio transmitter 120 can be connected via an audio connectivity cable 130. The radio transmitter 120 can broadcast data in a specific frequency range, such as VHF or UHF. Similarly, in some embodiments, the radio transmitter 120 can be placed nearby the first electronic device 110. When the first electronic device 110 outputs sounds in an environment, the radio transmitter 120 can obtain the sounds in the environment.

Figure 3:
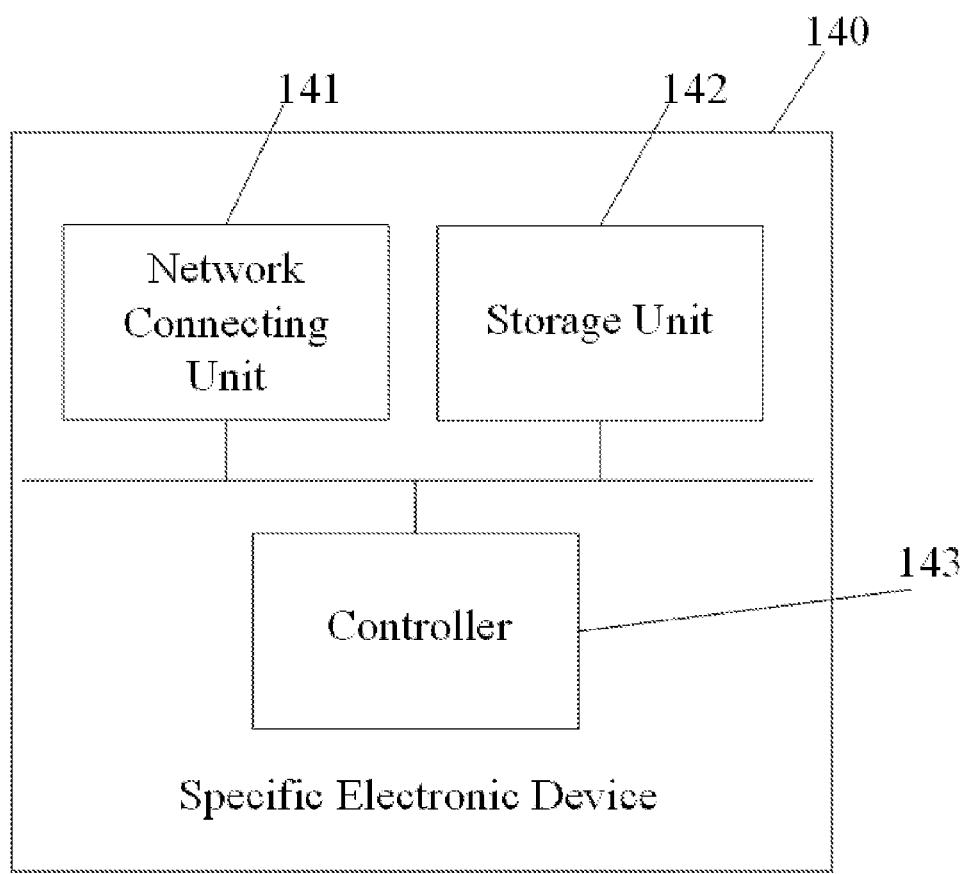
FIG. 3 is a schematic diagram illustrating an embodiment of a specific electronic device of the invention.

FIG. 3 is a schematic diagram illustrating an embodiment of a specific electronic device of the invention. As shown in FIG. 3, the specific electronic device 140 comprises a network connecting unit 141, a storage unit 142, and a controller 143. The network connecting unit 141 can connect to other electronic devices having wireless connecting capabilities via a network, such as a wired or a wireless network such as Wi-Fi or Bluetooth network. It is understood that, in some embodiments, the network connecting unit 141 may be a network connecting unit implemented with a low-power consumption technology, such as Bluetooth Smart technology. The network connecting unit 141 has two modes, such as a central mode and a peripheral mode. In the central mode, the network connecting unit can receive data from the network connecting units of other electronic devices, and the network connecting unit can actively connect to other electronic devices. In the peripheral mode, the network connecting unit can broadcast signals, such as its identification data. However, the network connecting unit cannot actively connect to other electronic devices in the peripheral mode. In some embodiments, the network connecting unit 141 is in the peripheral mode. In other words, the network connecting unit 141 has data broadcasting capabilities, and the network connecting unit 141 cannot actively connect to other electronic devices, wherein the network connecting unit 141 can be passively connected to other electronic devices. The storage unit 142 can store related data, such as identification data corresponding to the specific electronic device 140. The controller 143 can control related operations of hardware and software in the specific electronic device 140.

Figure 4:
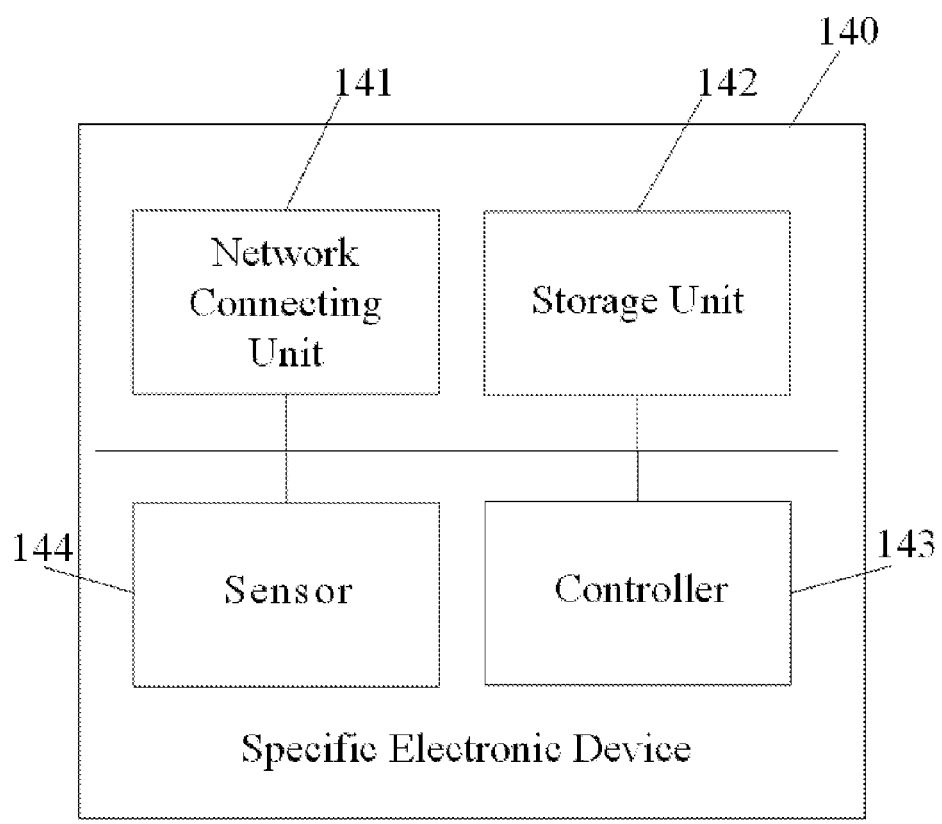
FIG. 4 is a schematic diagram illustrating another embodiment of a specific electronic device of the invention.

FIG. 4 is a schematic diagram illustrating another embodiment of a specific electronic device of the invention. As shown in FIG. 4, the specific electronic device 140 comprises a network connecting unit 141, a storage unit 142, at least one sensor 144, and a controller 143. The network connecting unit 141 can connect to other electronic devices having wireless connecting capabilities via a network, such as a wired or wireless network such as Wi-Fi or Bluetooth network. Similarly, in some embodiments, the network connecting unit 141 may be a network connecting unit implemented with a low-power consumption technology, such as Bluetooth Smart technology. The network connecting unit 141 has two modes, such as a central mode and a peripheral mode. In the central mode, the network connecting unit can receive data from the network connecting units of other electronic devices, and the network connecting unit can actively connect to other electronic devices. In the peripheral mode, the network connecting unit can broadcast signals, such as its identification data. However, the network connecting unit cannot actively connect to other electronic devices in the peripheral mode. In some embodiments, the network connecting unit 141 is in the peripheral mode. In other words, the network connecting unit 141 has data broadcasting capabilities, and the network connecting unit 141 cannot actively connect to other electronic devices, wherein the network connecting unit 141 can be passively connected by other electronic devices. The storage unit 142 can store related data, such as identification data corresponding to the specific electronic device 140. It is understood that, in some embodiments, the sensor 144 can detect a posture and/or motion corresponding to the specific electronic device 140. For example, the sensor 144 may be an accelerometer for generating information of velocity and displacement when the device moves. In another example, the sensor 144 may be a Gyro sensor for generating information of angular acceleration when the device moves. In another example, the sensor 144 may be an e-compass for detecting an angle of the device in regard to a geographical direction, such as the direction of the North Pole or the South Pole. It is noted that, the above sensors are only examples of the present application, and the present invention is not limited thereto. Any sensor that can detect the posture and/or motion of an electronic device can be applied in the present invention. As described, the sensor 144 can detect the posture of the specific electronic device 140. It is understood that, in some embodiments, the posture can be the angular information of the specific electronic device 140 in regard to at least one reference point. In some embodiments, the posture of the specific electronic device 140 can be represented by an angle corresponding to an axis which is vertical to at least one plane of the specific electronic device 140 in regard to a specific direction, such as the gravity direction or the geographical direction. Additionally, in some embodiments, the sensor 144 can detect an environmental factor. For example, the sensor 144 may be a temperature sensor for detecting the temperature of an environment where the specific electronic device 140 is in. In another example, the sensor 144 may be a pressure sensor for detecting the pressure of an environment where the specific electronic device 140 is in. It is noted that, the above sensor are only examples of the present application, and the present invention is not limited thereto. The controller 143 can control related operations of hardware and software in the specific electronic device 140. The controller 143 can determine whether to generate related data according to the data output by the sensor 144.

Figure 5:
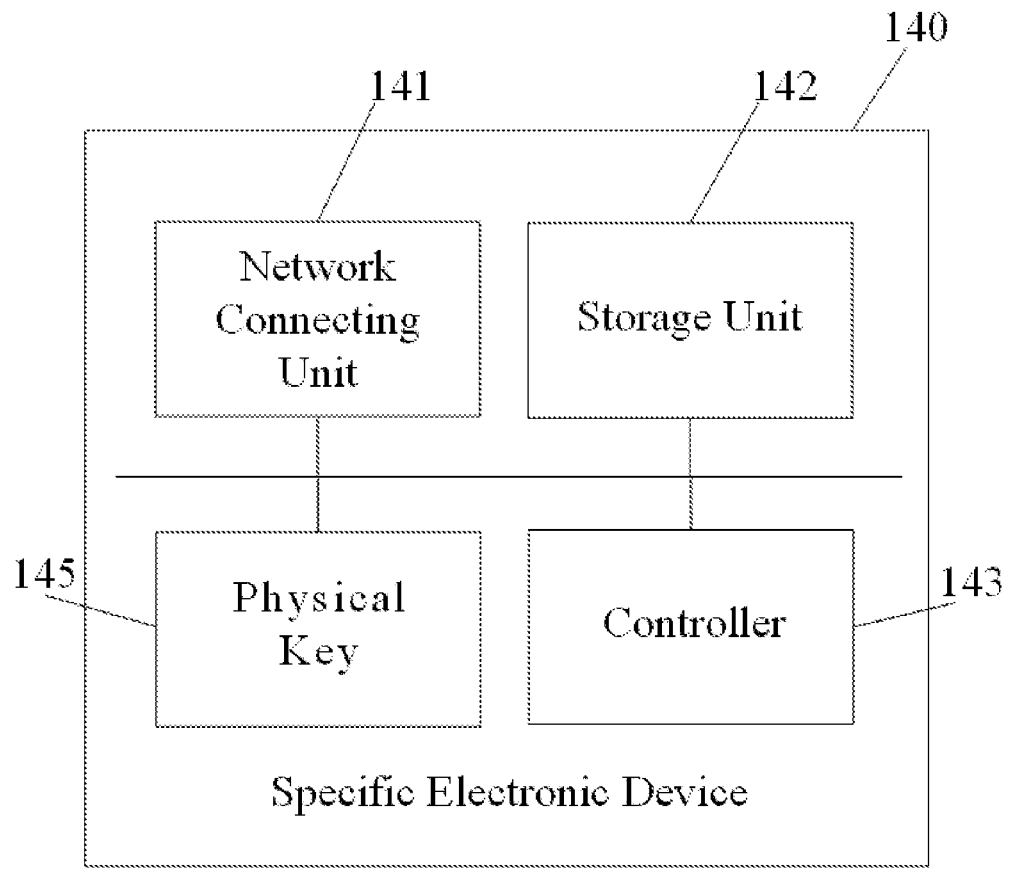
FIG. 5 is a schematic diagram illustrating another embodiment of a specific electronic device of the invention.

FIG. 5 is a schematic diagram illustrating another embodiment of a specific electronic device of the invention. As shown in FIG. 5, the specific electronic device 140 comprises a network connecting unit 141, a storage unit 142, at least one physical key 145, and a controller 143. The network connecting unit 141 can connect to other electronic devices having wireless connecting capabilities via a network, such as a wired or wireless network such as Wi-Fi or Bluetooth network. Similarly, in some embodiments, the network connecting unit 141 may be a network connecting unit implemented with a low-power consumption technology, such as Bluetooth Smart technology. The network connecting unit 141 has two modes, such as a central mode and a peripheral mode. In the central mode, the network connecting unit can receive data from the network connecting units of other electronic devices, and the network connecting unit can actively connect to other electronic devices. In the peripheral mode, the network connecting unit can broadcast signals, such as its identification data. However, the network connecting unit cannot actively connect to other electronic devices in the peripheral mode. In some embodiments, the network connecting unit 141 is in the peripheral mode. In other words, the network connecting unit 141 has data broadcasting capabilities, and the network connecting unit 141 cannot actively connect to other electronic devices, wherein the network connecting unit 141 can be passively connected to other electronic devices. The storage unit 142 can store related data, such as identification data corresponding to the specific electronic device 140. The controller 143 can control related operations of hardware and software in the specific electronic device 140. The controller 143 can determine whether to generate related data according to whether the physical key 145 is pressed or not and/or the type of the pressed physical key 145.

Figure 6:
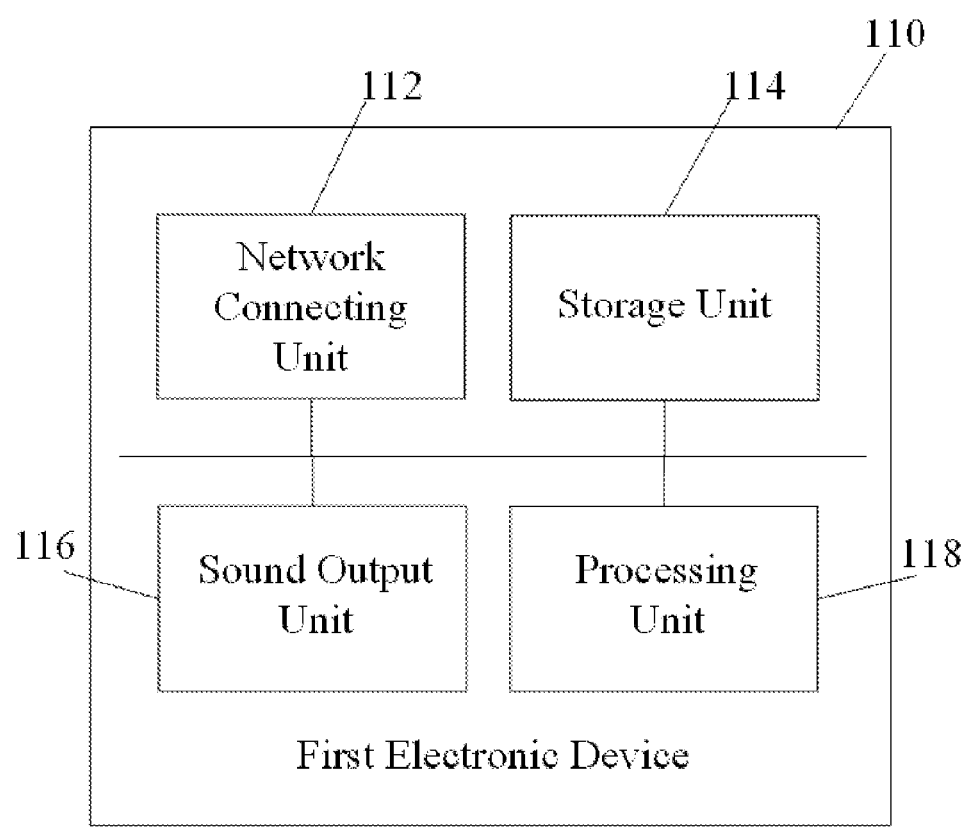
FIG. 6 is a schematic diagram illustrating an embodiment of a first electronic device of the invention.

FIG. 6 is a schematic diagram illustrating an embodiment of a first electronic device of the invention. The first electronic device can be any electronic device having network connecting capabilities, such as a computer or a portable device, such as a mobile phone, a smart phone, a PDA (Personal Digital Assistant), a GPS (Global Positioning System), a notebook, or a tablet computer. As shown in FIG. 6, the first electronic device 110 comprises a network connecting unit 112, a storage unit 114, a sound output unit 116, and a processing unit 118. The network connecting unit 112 can connect to other electronic devices having wireless connecting capabilities via a network, such as a wired network or a wireless such as Wi-Fi or Bluetooth network. Similarly, in some embodiments, the network connecting unit 112 may be a network connecting unit implemented with a low-power consumption technology, such as Bluetooth Smart technology. The network connecting unit 112 has two modes, such as a central mode and a peripheral mode. In the central mode, the network connecting unit can receive data from the network connecting units of other electronic devices, and the network connecting unit can actively connect to other electronic devices. In the peripheral mode, the network connecting unit can broadcast signals, such as its identification data. However, the network connecting unit cannot actively connect to other electronic devices in the peripheral mode. In some embodiments, the network connecting unit 112 is in the central mode. In other words, the network connecting unit 112 has data receiving capabilities, and the network connecting unit 112 can actively connect to other electronic devices. The storage unit 114 can store related data. The sound output unit 116 can output sounds generated by the first electronic device 110. The processing unit 118 can control related operations of hardware and software in the first electronic device 110.

Figure 7:
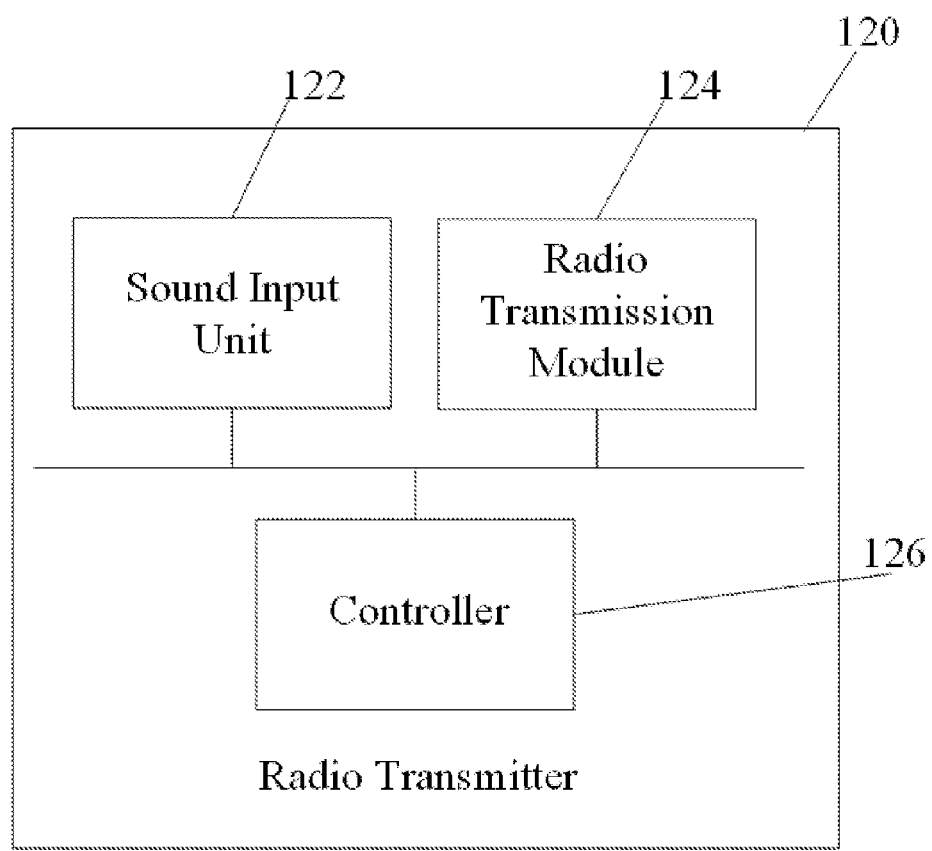
FIG. 7 is a schematic diagram illustrating an embodiment of a radio transmitter of the invention.

FIG. 7 is a schematic diagram illustrating an embodiment of a radio transmitter of the invention. The radio transmitter may be a handheld transceiver or Walkie-Talkie. As shown in FIG. 7, the radio transmitter 120 comprises a sound input unit 122, a radio transmission module 124, and a controller 126. The sound input unit 122 can receive sounds from outside of the radio transmitter 120. In some embodiments, the radio transmitter 120 can be placed nearby the first electronic device 110. When the first electronic device 110 outputs sounds in an environment, the sound input unit 122 of the radio transmitter 120 can obtain the sounds in the environment. In some embodiments, the sound input unit 122 can be connected to the sound output unit 116 of the first electronic device 110 via an audio connectivity cable 130, so that the sounds generated by the first electronic device 110 can be received. The radio transmission module 124 may be a transmitter with at least one antenna. The transmitter can broadcast data in a specific frequency range, such as VHF or UHF. The controller 126 can control related operations of hardware and software in the radio transmitter 120. It is understood that, in some embodiments, the radio transmitter 120 can have VOX capabilities. When any sound is detected by the controller 126 of the radio transmitter 120, the sound is automatically broadcasted in the specific frequency range via the radio transmission module 124.

Figure 8:
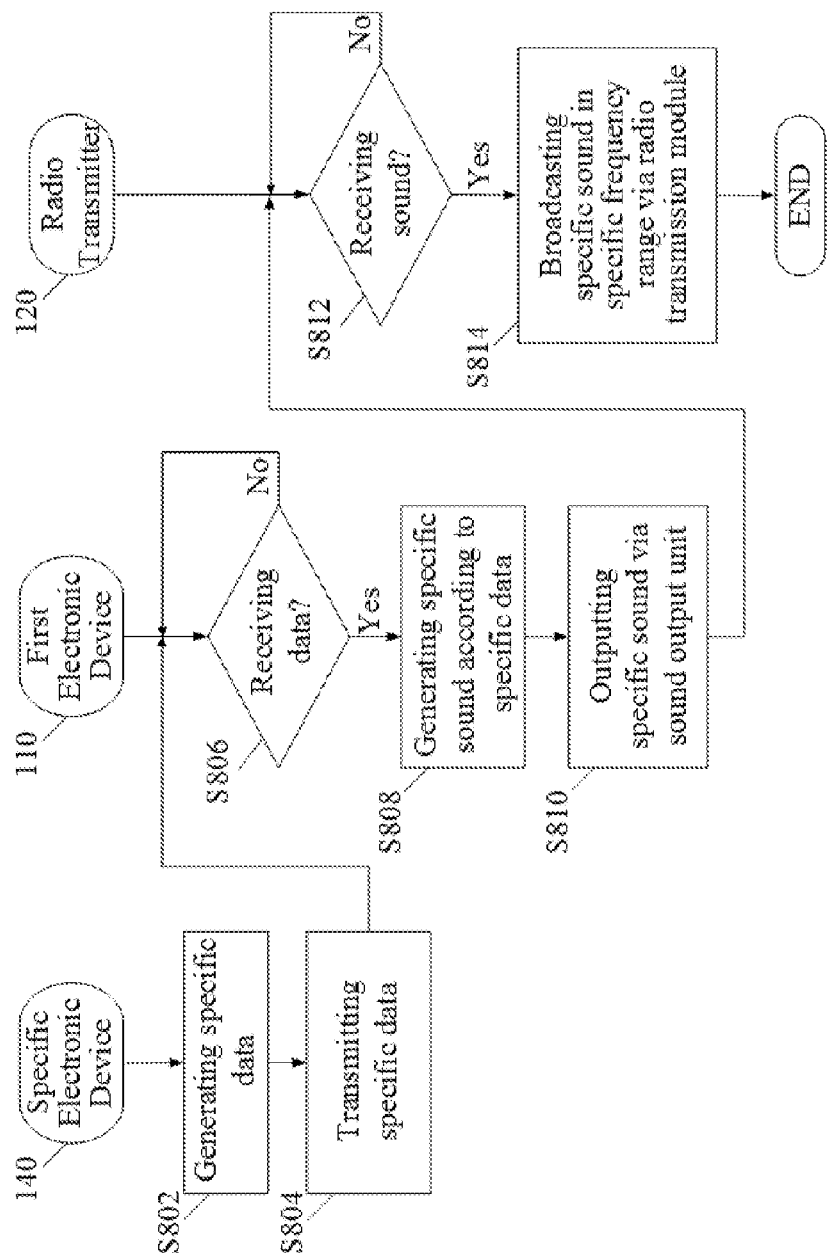
FIG. 8 is a flowchart of an embodiment of a sound generation and transmission method using a radio transmitter of the invention.

FIG. 8 is a flowchart of an embodiment of a sound generation and transmission method using a radio transmitter of the invention.

In step S802, the specific electronic device 140 generates specific data, and in step S804, transmits the specific data via the network connecting unit 141. It is understood that, in some embodiments, the network connecting unit 141 may be a network connecting unit implemented with a low-power consumption technology, such as Bluetooth Smart technology. The Bluetooth Smart technology supports two modes, such as central and peripheral. In some embodiments, the network connecting unit 141 is in the peripheral mode. In other words, the network connecting unit 141 has data broadcasting capabilities, and the network connecting unit 141 cannot actively connect to other electronic devices, wherein the network connecting unit 141 can be passively connected by other electronic devices. In step S806, the first electronic device 110 determines whether any data is received via the network connecting unit 112. Similarly, in some embodiments, the network connecting unit 112 may be a network connecting unit implemented with a low-power consumption technology, such as Bluetooth Smart technology. The Bluetooth Smart technology supports two modes: central and peripheral. In some embodiments, the network connecting unit 112 is in the central mode. In other words, the network connecting unit 112 has data receiving capabilities, and the network connecting unit 112 can actively connect to other electronic devices. When no data is received (No in step S806), the procedure remains at step S806. When data, such as the specific data transmitted by the specific electronic device 140 is received (Yes in step S806), in step S808, a specific sound is generated according to the received specific data, and in step S810, the specific sound is output via the sound output unit 116. It is understood that, in some embodiments, the storage unit of the first electronic device 110 can store a plurality of candidate sounds. The processing unit 118 can select one of the candidate sounds as the specific sound according to the specific data, and output the specific sound via the sound output unit 116. In some embodiments, the processing unit 118 can analyze the specific data to obtain a plurality of texts or numbers, transforms the texts or numbers into the specific sound according to a text to sound algorithm, and output the specific sound via the sound output unit 116. In step S812, the radio transmitter 120 determines whether any sound is received via the sound input unit 122. It is noted that, in some embodiments, the radio transmitter 120 can be placed nearby the first electronic device 110. When the first electronic device 110 outputs sounds in an environment, the sound input unit of the radio transmitter 120 can obtain the sounds in the environment. In some embodiments, the sound input unit 122 of the radio transmitter 120 can be connected to the sound output unit 116 of the first electronic device 110 via the audio connectivity cable 130, so that the sounds generated by the first electronic device 110 can be received. When no sound is received (No in step S812), the procedure remains at step S812. When a sound is received, such as the specific sound output by the first electronic device 110 (Yes in step S812), in step S814, the specific sound is broadcasted in a specific frequency range, such as VHF or UHF via the radio transmission module 124. As described, in some embodiments, the radio transmitter 120 can have VOX capabilities. When the specific sound is detected by the controller 126 of the radio transmitter 120, the specific sound is automatically broadcasted in the specific frequency range via the radio transmission module 124. It is noted that, when the first electronic device 110 receives the specific data from the specific electronic device 140 via a wireless network, the frequency range of the wireless network used by the first electronic device 110 and the specific electronic device 140 is different than the specific frequency range used by the radio transmitter 120. It is noted that, when the radio transmitter 120 broadcasts the specific sound in the specific frequency range, other radio reception devices can receive the specific sound in the specific frequency range.

It is noted that, the specific electronic device 140 can generate the specific data according to different applications and requirements.

Figure 9:
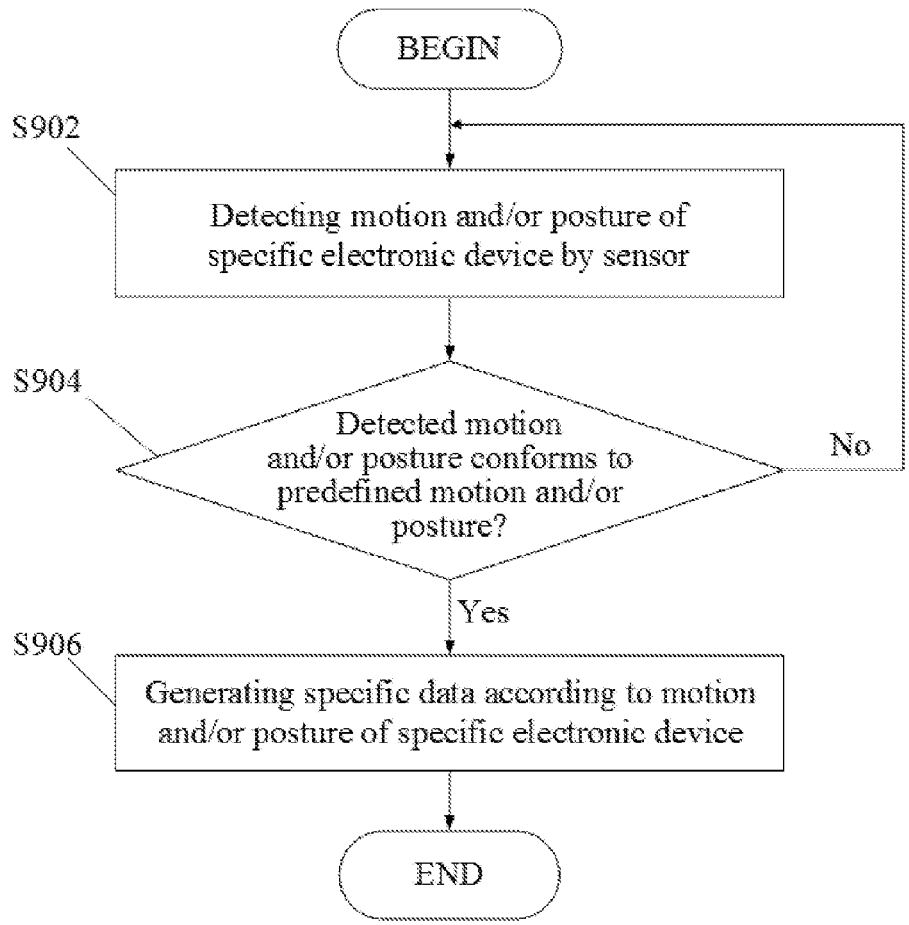
FIG. 9 is a flowchart of an embodiment of a method for generating specific data of the invention.

FIG. 9 is a flowchart of an embodiment of a method for generating specific data of the invention. In step S902, at least one sensor detects a motion and/or posture corresponding to the specific electronic device 140. It is understood that, in some embodiments, the sensor may be an accelerometer for generating information of velocity and displacement when the device moves. In some embodiments, the sensor may be a Gyro sensor for generating information of angular acceleration when the device moves. In some embodiments, the motion sensor may be an e-compass for detecting an angle of the device in regard to a geographical direction, such as the direction of the North Pole or the South Pole. It is noted that, the above sensors are only examples of the present application, and the present invention is not limited thereto. Any sensor that can detect the posture and/or motion of an electronic device can be applied in the present invention. As described, the sensor can detect the posture of the specific electronic device. It is understood that, in some embodiments, the posture can be the angular information of the specific electronic device 140 in regard to at least one reference point. In some embodiments, the posture of the specific electronic device can be represented by an angle corresponding to an axis which is vertical to at least one plane of the specific electronic device in regard to a specific direction, such as the gravity direction or the geographical direction. In step S904, it is determined whether the motion and/or posture of the specific electronic device 140 conforms to at least one predefined motion and/or posture. When the motion and/or posture of the specific electronic device 140 does not conform to the predefined motion and/or posture (No in step S904), the procedure returns to step S902. When the motion and/or posture of the specific electronic device 140 conforms to the predefined motion and/or posture (Yes in step S904), in step S906, specific data is generated according to the motion and/or posture of the specific electronic device 140. It is understood that, in some embodiments, the specific electronic device 140 can generate different specific data according to different motions and/or posture, and the first electronic device 110 can generate different specific sounds according to different specific data.

Figure 10:
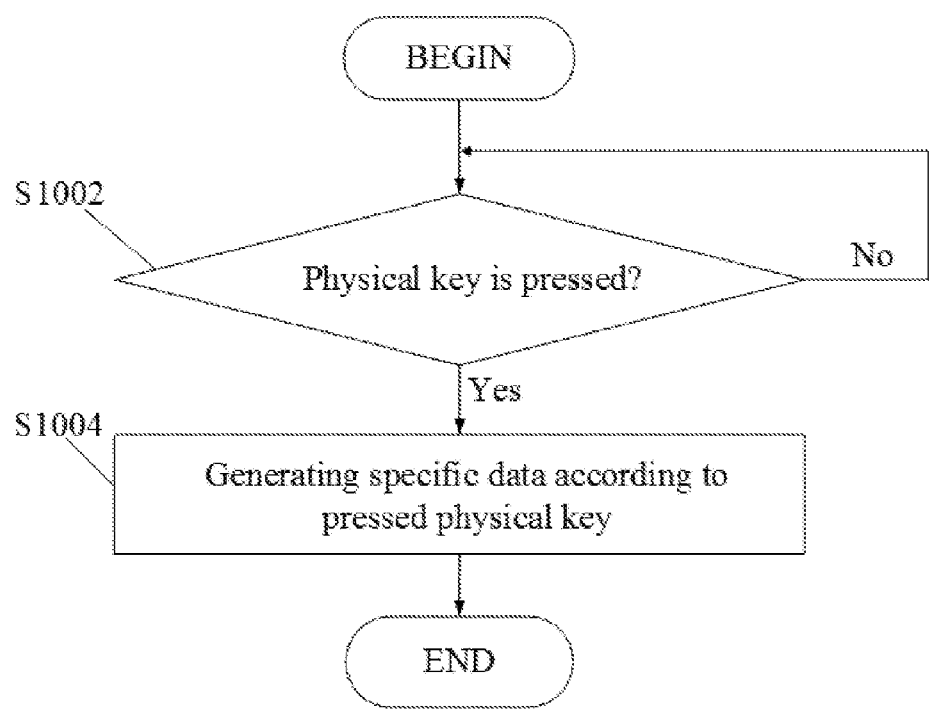
FIG. 10 is a flowchart of another embodiment of a method for generating specific data of the invention.

FIG. 10 is a flowchart of another embodiment of a method for generating specific data of the invention. In step S1002, it is determined whether at least one physical key of the specific electronic device 140 is pressed or not. When the physical key is not pressed (No in step S1002), the procedure remains at step S1002. When the physical key is pressed (Yes in step S1002), in step S1004, specific data is generated according to the pressed physical key. Similarly, the specific electronic device 140 can generate different specific data according to different physical keys which have been pressed, and the first electronic device 110 can generate different specific sounds according to different specific data.

Figure 11:
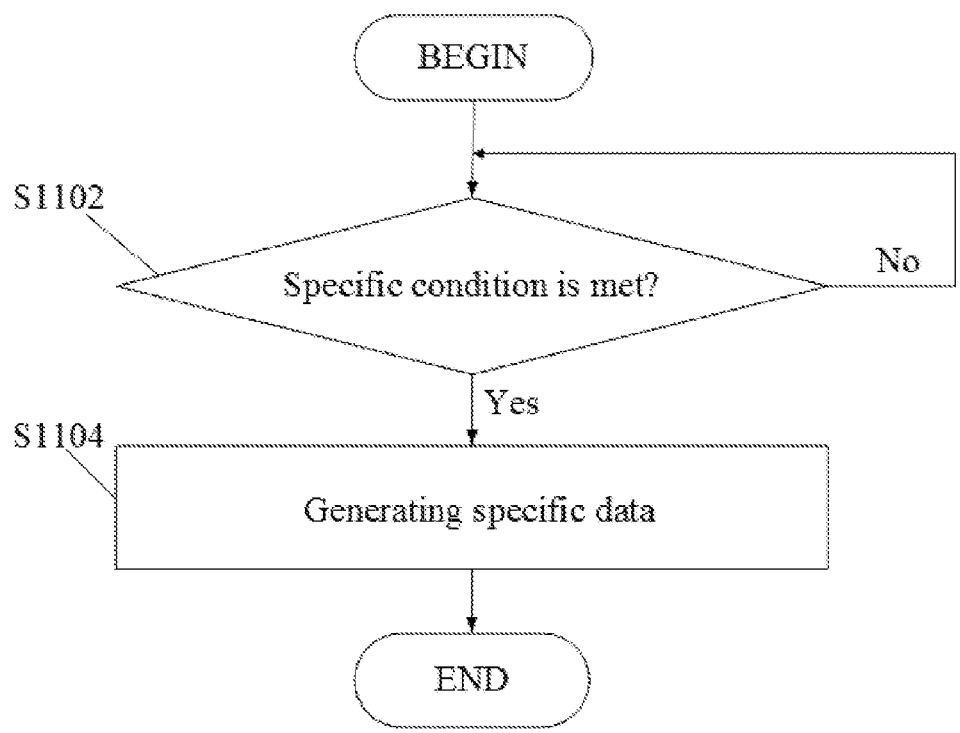
FIG. 11 is a flowchart of another embodiment of a method for generating specific data of the invention.

FIG. 11 is a flowchart of another embodiment of a method for generating specific data of the invention. In step S1102, the specific electronic device 140 determines whether a specific condition is met or not. It is noted that, the specific condition may be different according to different requirements and applications. For example, the specific condition may be a specific time. When the current time reaches the specific time, the specific condition is met. In another example, the specific condition may be a specific region. When the location of the specific electronic device 140 is within the specific region, the specific condition is met. In another example, a sensor of the specific electronic device 140 can detect related data, such as an environmental factor, and it is determined whether the detected data conforms to a specific threshold value or a specific state. When the detected data conforms to the specific threshold value or the specific state, the specific condition is met. For example, the sensor may be a temperature sensor for detecting the temperature of an environment where the specific electronic device 140 is in. In another example, the sensor may be a pressure sensor for detecting the pressure of an environment where the specific electronic device 140 is in. It is noted that, the above sensors are only examples of the present application, and the present invention is not limited thereto. When the specific condition is not met (No in step S1102), the procedure remains at step S1102. When the specific condition is met (Yes in step S1102), in step S1104, specific data is generated. Similarly, the specific electronic device 140 can generate different specific data according to different specific conditions, and the first electronic device 110 can generate different specific sounds according to different specific data.

It is understood that, in some embodiments, the specific electronic device 140 can optionally enter a sleep mode after a specific period subsequent to the transmission of the specific data. In some embodiments, the specific electronic device 140 can continuously transmit the generated specific data in a predefined period via a wireless network, stop transmitting the specific data after the predefined period, and optionally enter a sleep mode. In some embodiments, the specific electronic device 140 can continuously transmit the generated specific data via a wireless network. After the first electronic device 110 receives the specific data transmitted by the specific electronic device 140, the first electronic device 110 can connect to the specific electronic device 140, and instruct the specific electronic device 140 to stop generating and transmitting the specific data.

Figure 12:
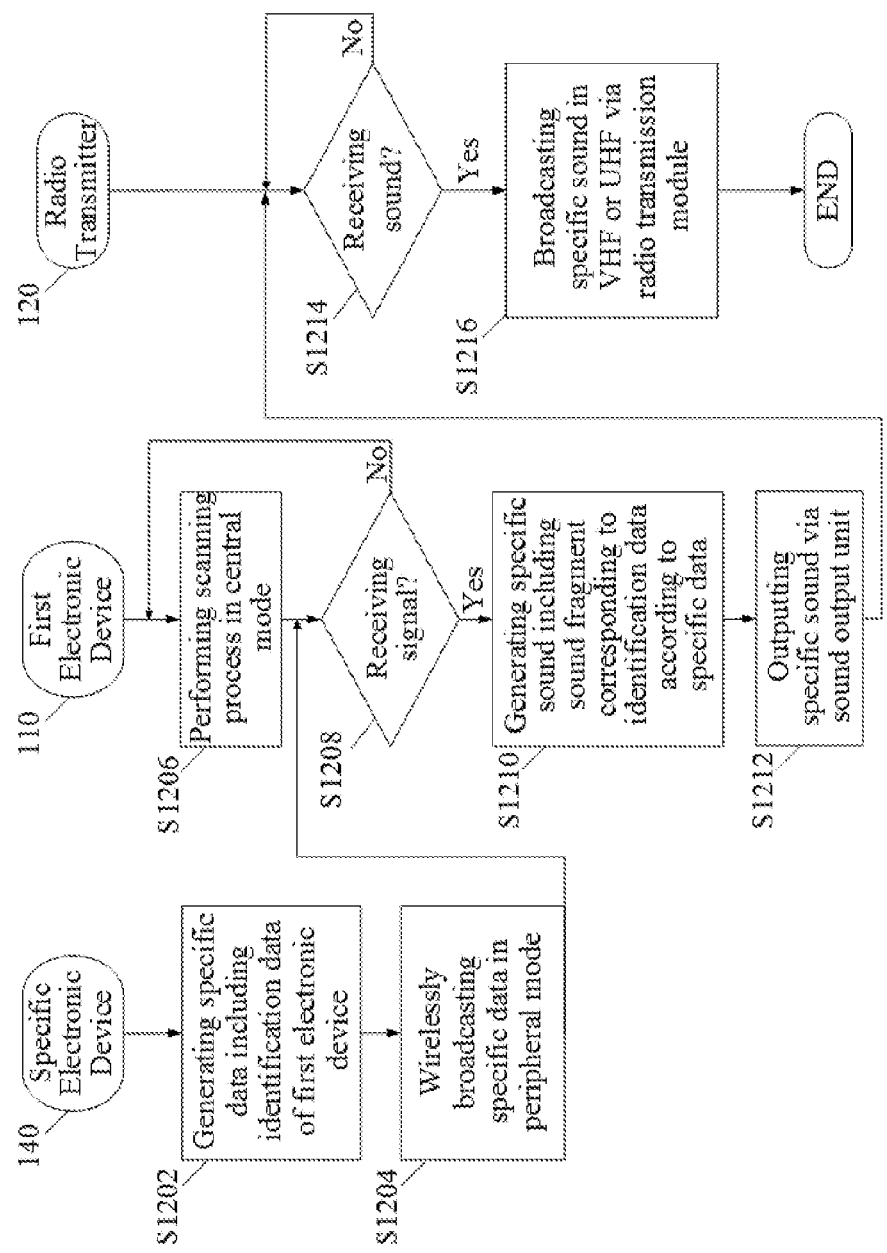
FIG. 12 is a flowchart of another embodiment of a method for generating specific data of the invention.

FIG. 12 is a flowchart of another embodiment of a sound generation and transmission method using a radio transmitter of the invention.

In step S1202, the specific electronic device 140 generates specific data. It is noted that, the specific data can be generated according to the embodiment of FIG. 9, FIG. 10, or FIG. 11. Then, in step S1204, the specific electronic device 140 wirelessly broadcasts the specific data via the network connecting unit 141 in the peripheral mode. It is noted that, the network connecting unit 141 may be a network connecting unit implemented with a low-power consumption technology, such as Bluetooth Smart technology. In the embodiment, the network connecting unit 141 has data broadcasting capabilities, and the network connecting unit 141 cannot actively connect to other electronic devices, wherein the network connecting unit 141 can be passively connected by other electronic devices. In step S1206, the first electronic device 110 performs a scanning process via the network connecting unit 112 in the central mode, thus to determine whether a signal is received or not. It is noted that, in some embodiments, the network connecting unit 112 may be a network connecting unit implemented with a low-power consumption technology, such as Bluetooth Smart technology. In the embodiments, the network connecting unit 112 has data receiving capabilities, and the network connecting unit 112 can actively connect to other electronic devices. When no signal is received (No in step S1208), the procedure returns to step S1206. When a signal, such as the specific data transmitted by the specific electronic device 140 is received (Yes in step S1208), in step S1210, a specific sound is generated according to the received specific data. It is understood that, since the specific data comprises the identification data corresponding to the specific electronic device 140, the specific sound comprises a sound fragment corresponding to the identification data, such that users who heard the sound fragment can realize the specific sound corresponds to the specific electronic device 140. Then, in step S1212, the specific sound is output via the sound output unit 116. Similarly, in some embodiments, the storage unit of the first electronic device 110 can store a plurality of candidate sounds. The processing unit 118 can select one of the candidate sounds as the specific sound according to the specific data, and output the specific sound via the sound output unit 116. In some embodiments, the processing unit 118 can analyze the specific data to obtain a plurality of texts or numbers, transforms the texts or numbers into the specific sound according to a text to sound algorithm, and output the specific sound via the sound output unit 116. In step S1214, the radio transmitter 120 determines whether any sound is received via the sound input unit 122. It is noted that, in some embodiments, the radio transmitter 120 can be placed nearby the first electronic device 110. When the first electronic device 110 outputs sounds in an environment, the sound input unit of the radio transmitter 120 can obtain the sounds in the environment. In some embodiments, the sound input unit 122 of the radio transmitter 120 can be connected to the sound output unit 116 of the first electronic device 110 via the audio connectivity cable 130, such that the sounds generated by the first electronic device 110 can be received. When no sound is received (No in step S1214), the procedure remains at step S1214. When a sound is received, such as the specific sound output by the first electronic device 110 (Yes in step S1214), in step S1216, the specific sound is broadcasted in the frequency range of VHF or UHF via the radio transmission module 124. It is noted that, the frequency range of the wireless network used by the first electronic device 110 and the specific electronic device 140 is different than the frequency range used by the radio transmitter 120. It is noted that, when the radio transmitter 120 broadcasts the specific sound in the frequency range, other radio reception devices can receive the specific sound in the frequency range.

Similarly, in some embodiments, the specific electronic device 140 can optionally enter a sleep mode after a specific period subsequent to the transmission of the specific data. In some embodiments, the specific electronic device 140 can continuously transmit the generated specific data in a predefined period via a wireless network, stop transmitting the specific data after the predefined period, and optionally enter a sleep mode. In some embodiments, the specific electronic device 140 can continuously transmit the generated specific data via a wireless network. After the first electronic device 110 receives the specific data transmitted by the specific electronic device 140, the first electronic device 110 can connect to the specific electronic device 140, and instruct the specific electronic device 140 to stop generating and transmitting the specific data.

Figure 13:
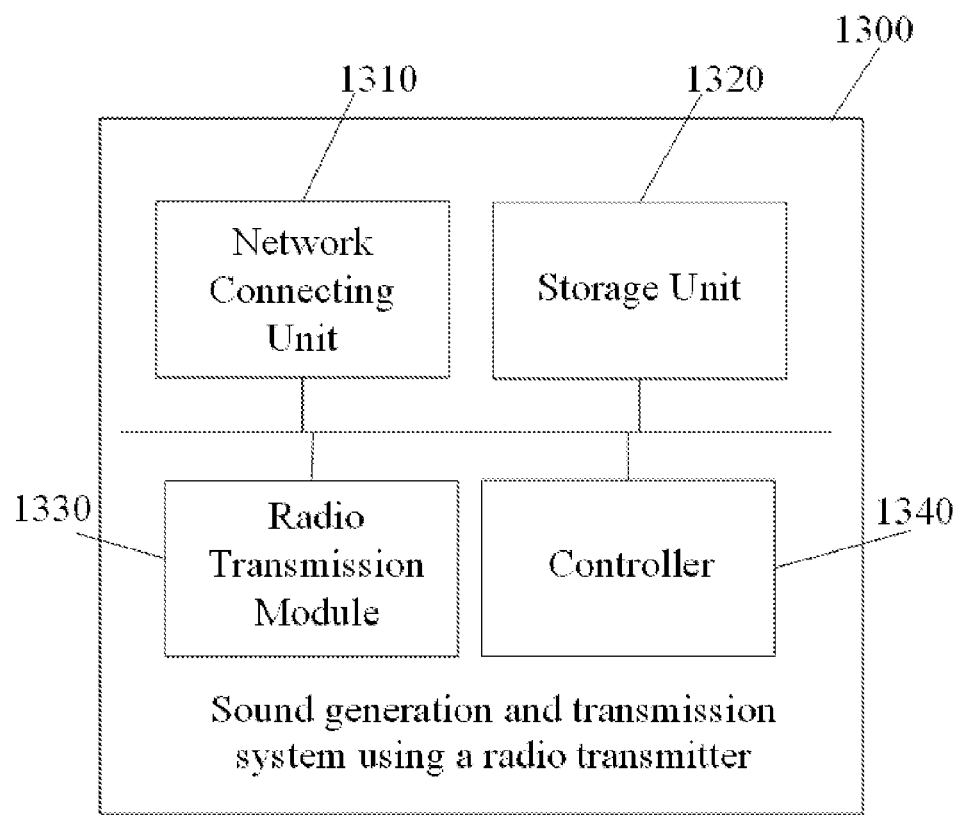
FIG. 13 is a schematic diagram illustrating another embodiment of a sound generation and transmission system using a radio transmitter of the invention.

FIG. 13 is a schematic diagram illustrating another embodiment of a sound generation and transmission system using a radio transmitter of the invention. The sound generation and transmission system using a radio transmitter 1300 can be used in an electronic device, such as a handheld transceiver or Walkie-Talkie. The sound generation and transmission system using a radio transmitter 1300 comprises a network connecting unit 1310, a storage unit 1320, a radio transmission module 1330, and a controller 1340. The network connecting unit 1310 can connect to other electronic devices having wireless connecting capabilities via a network, such as a wired or a wireless network such as Wi-Fi or Bluetooth network. Similarly, in some embodiments, the network connecting unit 1310 may be a network connecting unit implemented with a low-power consumption technology, such as Bluetooth Smart technology. The network connecting unit 1310 has two modes, such as a central mode and a peripheral mode. In the central mode, the network connecting unit can receive data from the network connecting units of other electronic devices, and the network connecting unit can actively connect to other electronic devices. In the peripheral mode, the network connecting unit can broadcast signals, such as its identification data. However, the network connecting unit cannot actively connect to other electronic devices in the peripheral mode. In some embodiments, the network connecting unit 1310 is in the central mode. In other words, the network connecting unit 1310 has data receiving capabilities, and the network connecting unit 1310 can actively connect to other electronic devices. The storage unit 1320 can store related data. The radio transmission module 1330 may be a transmitter with at least one antenna. The transmitter can broadcast data in a specific frequency range, such as VHF or UHF. The controller 1340 can control related operations of hardware and software in the electronic device. It is understood that, in some embodiments, the electronic device can have VOX capabilities. When any sound is detected by the controller 1340, the sound is automatically broadcasted in the specific frequency range via the radio transmission module 1330.

Figure 14:
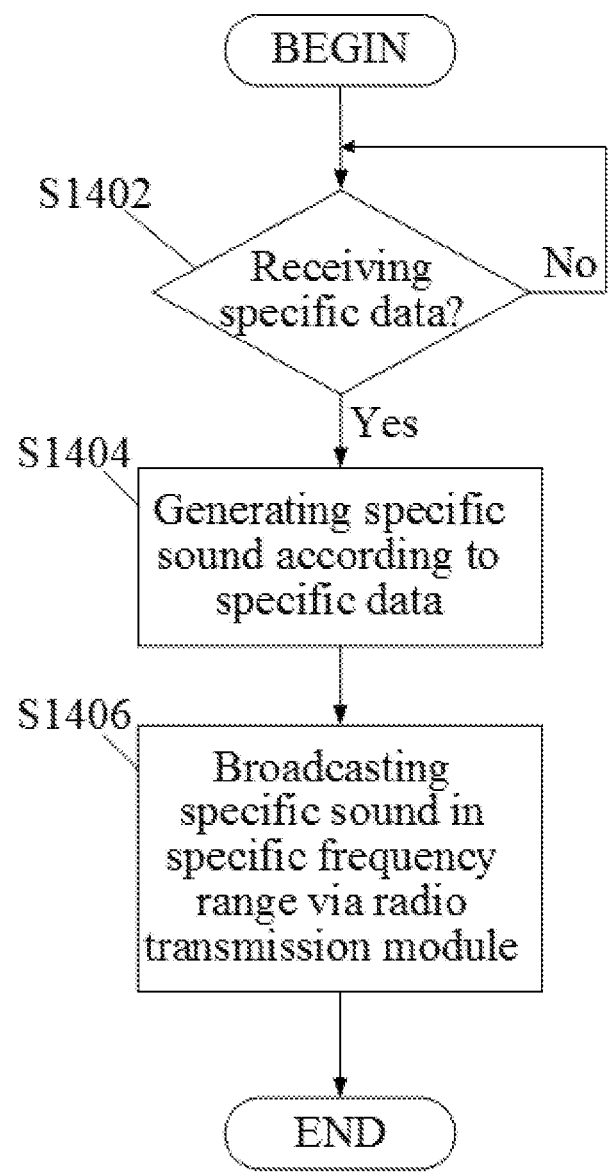
FIG. 14 is a flowchart of another embodiment of a sound generation and transmission method using a radio transmitter of the invention.

FIG. 14 is a flowchart of another embodiment of a sound generation and transmission method using a radio transmitter of the invention. The sound generation and transmission method using a radio transmitter of the invention can be used in an electronic device having network connecting capabilities.

In step S1402, it is determined whether any data is received via a network connecting unit of the electronic device. It is understood that, in some embodiments, the network connecting unit may be a network connecting unit implemented with a low-power consumption technology, such as Bluetooth Smart technology. The Bluetooth Smart technology supports two modes: central and peripheral. In some embodiments, the network connecting unit is in the central mode. In other words, the network connecting unit has data receiving capabilities, and the network connecting unit can actively connect to other electronic devices. When no data is received (No in step S1402), the procedure remains at step S1402. When data, such as specific data transmitted by a specific electronic device is received (Yes in step S1402), in step S1404, a specific sound is generated according to the received specific data. It is understood that, in some embodiments, a storage unit of the electronic device can store a plurality of candidate sounds. One of the candidate sounds can be selected as the specific sound according to the specific data. In some embodiments, the specific data can be analyzed to obtain a plurality of texts or numbers, and the texts or numbers can be transformed into the specific sound according to a text to sound algorithm. Then, in step S1406, the specific sound is broadcasted in a specific frequency range, such as VHF or UHF via a radio transmission module of the electronic device. It is noted that, when the radio transmission module broadcasts the specific sound in the specific frequency range, other radio reception devices can receive the specific sound in the specific frequency range.

Figure 15:
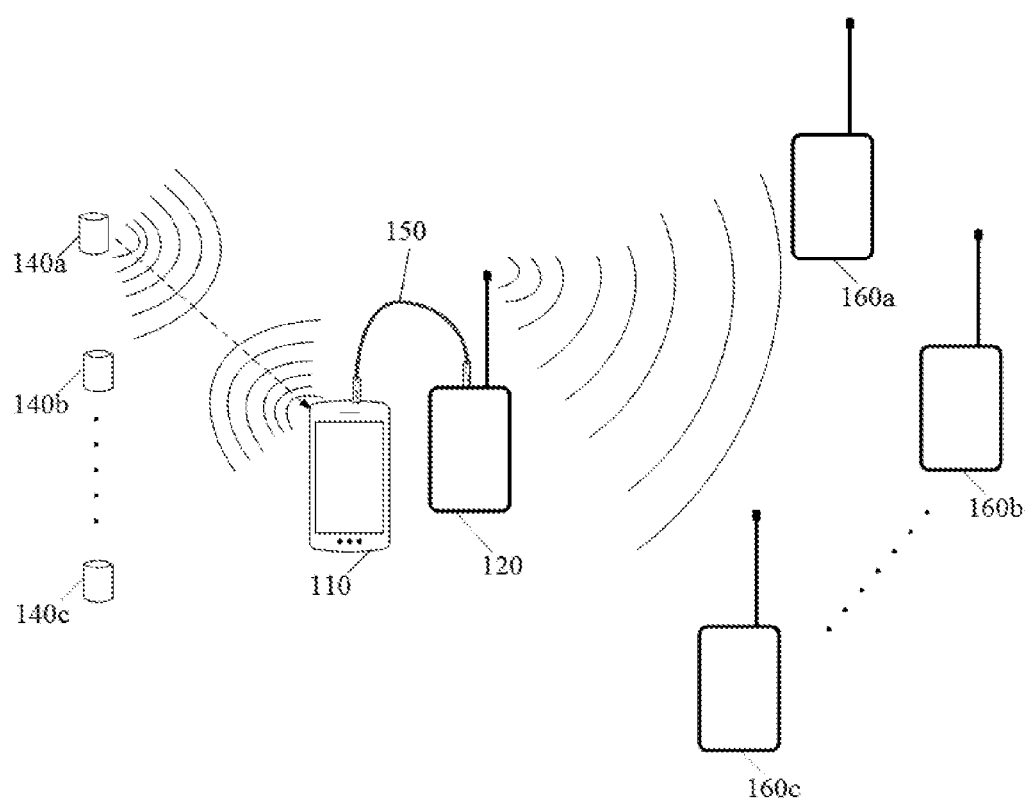
FIG. 15 is a schematic diagram illustrating another embodiment of an example of sound generation and transmission using a radio transmitter of the invention.

In an example of FIG. 15, a specific electronic device (140a, 140b, 140c) can be set on a table of a restaurant, and one or more waiters can wear a radio reception device (160a, 160b, 160c), wherein the radio reception device operates in a specific frequency range, such as VHF or UHF. When a customer of a specific table needs service, the customer can press a physical key of the specific electronic device or shake the specific electronic device. For example, the customer can easily and elegantly complete a procedure for service request by pressing a physical key of the specific electronic device 140a or shaking the specific electronic device 140a, thus driving the specific electronic device 140a to generate and broadcast specific data via a wireless network, such as a Bluetooth network. First electronic device 110, such as a smart phone or a tablet computer can receive the specific data broadcasted by the specific electronic device 140a via a wireless network. The first electronic device 110 can generate a specific sound, such as 'the specific table requests services' according to the specific data, and output the specific sound to a radio transmitter 120 via an audio connectivity cable 130. The radio transmitter 120 can have VOX capabilities. When the specific sound output by the first electronic device 110 is detected, the radio transmitter 120 automatically broadcasts the specific sound in the specific frequency range, such as VHF or UHF. The radio reception devices (160a, 160b, 160c) worn by the waiters can receive the specific sound, so that the waiters will know the specific table requests services and provides services in real-time. It is noted that, the example in a restaurant is only an example of the present application, and the present invention is not limited thereto. The present invention can be used in any place, such as a restaurant, hospital, school, store, sports course, factory, or house.

Therefore, the sound generation and transmission systems and methods using a radio transmitter of the present invention can generate sounds according to received signals, and transmit the sounds via a radio transmitter. The present application provides a definite and novel signal transmission mechanism, in which existing equipment can be efficiently integrated to reduce deployment costs of related equipment, and improve user satisfaction for related services.

Sound generation and transmission methods using a radio transmitter may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A sound generation and transmission system using a radio transmitter, comprising:
    a first electronic device, comprising:
    a network connecting unit;
    a sound output unit; and
    a processing unit receiving specific data via the network connecting unit, generating a specific sound according to the specific data, and outputting the specific sound via the sound output unit; and
    a radio transmitter without a network interface, comprising:
    a sound input unit;
    a radio transmission module; and
    a controller receiving the specific sound via the sound input unit, converting the specific sound into a radio frequency signal, and broadcasting the radio frequency signal in a specific frequency range without a network connection via the radio transmission module.

2. The system of claim 1, wherein the sound input unit of the radio transmitter is connected to the sound output unit of the first electronic device via an audio connectivity cable, such that the specific sound is received from the sound output unit of the first electronic device.

3. The system of claim 1, further comprising a specific electronic device for generating the specific data, wherein the specific electronic device comprises at least one sensor for detecting a motion or posture corresponding to the specific electronic device, and the specific electronic device generates the specific data according to the detected motion or posture corresponding to the specific electronic device.

4. The system of claim 3, wherein a network connecting unit of the specific electronic device is in a peripheral mode, and the network connecting unit of the first electronic device is in a central mode, in which in the peripheral mode, the network connecting unit has data broadcasting capabilities, and the network connecting unit cannot actively connect to other electronic devices, and in the central mode, the network connecting unit has data receiving capabilities, and the network connecting unit can actively connect to other electronic devices.

5. The system of claim 1, further comprising a specific electronic device for generating the specific data, wherein the specific electronic device comprises at least one physical key, and when the physical key is pressed, the specific electronic device generates the specific data.

6. The system of claim 1, further comprising a specific electronic device for generating the specific data, wherein the specific electronic device determines whether a specific condition is met, and generates the specific data when the specific condition is met.

7. The system of claim 1, wherein the first electronic device further comprises a storage unit for storing a plurality of candidate sounds, and the processing unit selects one of the candidate sounds as the specific sound according to the specific data.

8. The system of claim 1, wherein the processing unit obtains a plurality of texts or numbers according to the specific data, and transforms the texts or numbers into the specific sound according to a text to sound algorithm.

9. The system of claim 1, wherein the specific data comprises identification data corresponding to the specific electronic device, and processing unit of the first electronic device further generates a sound fragment according to the identification data, wherein the specific sound comprises the sound fragment.

10. The system of claim 1, wherein the radio transmitter has voice operated transmission (VOX) capabilities, and the specific sound is automatically broadcasted in the specific frequency range via the radio transmission module when the specific sound is detected by the controller of the radio transmitter, wherein the specific frequency range comprises VHF (Very High Frequency) or UHF (Ultra High Frequency).

11. A sound generation and transmission method using a radio transmitter, comprising:
    receiving specific data by a network connecting unit;
    generating a specific sound according to the specific data;
    converting the specific sound into a radio frequency signal; and
    broadcasting the radio frequency signal in a specific frequency range without a network connection via a radio transmitter without a network interface.

* * * * *